(12) United States Patent
Kagle et al.

(10) Patent No.: US 6,601,056 B1
(45) Date of Patent: Jul. 29, 2003

(54) METHOD AND APPARATUS FOR AUTOMATIC FORMAT CONVERSION ON REMOVABLE DIGITAL MEDIA

(75) Inventors: Jonathan C. Kagle, Redmond, WA (US); Gilad Odinak, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 329 days.

(21) Appl. No.: 09/671,200

(22) Filed: Sep. 28, 2000

(51) Int. Cl.[7] .............................. G06F 17/30; G06F 7/00
(52) U.S. Cl. ................................... 707/1; 707/10
(58) Field of Search ..................... 707/10, 500.1, 707/523, 1; 703/24; 709/246; 379/93.17; 348/232; 710/1

(56) References Cited

U.S. PATENT DOCUMENTS

| | | | | |
|---|---|---|---|---|
| 5,471,606 A | * | 11/1995 | Huang et al. | 369/275.1 |
| 5,666,495 A | * | 9/1997 | Yeh | 710/303 |
| 5,694,580 A | * | 12/1997 | Narita et al. | 370/400 |
| 5,848,415 A | * | 12/1998 | Guck | 707/10 |
| 6,031,805 A | * | 2/2000 | Volkel | 369/53.22 |
| 6,260,043 B1 | * | 7/2001 | Puri et al. | 707/101 |
| 6,310,647 B1 | * | 10/2001 | Parulski et al. | 348/231.99 |
| 6,408,350 B1 | * | 6/2002 | Kawamura et al. | 710/62 |
| 6,421,429 B1 | * | 7/2002 | Merritt et al. | 379/100.13 |
| 6,442,573 B1 | * | 8/2002 | Schiller et al. | 345/719 |

OTHER PUBLICATIONS

Donald Golden and Michael Pechura (1986), The Structure of Microcomputer file systems, pp. 222–230.*

* cited by examiner

Primary Examiner—Safet Metjahic
Assistant Examiner—Merilyn Nguyen
(74) Attorney, Agent, or Firm—Banner & Witcoff, Ltd.

(57) ABSTRACT

A removable digital medium that supports a plurality of data formats and supports automatic format conversion based upon host requirements and preferences. The automatic format conversion enables information to be stored/retrieved in a format compatible with or selected by the consumer electronic device that is storing/reading the information. The removable digital medium is provided with a processor that supports a directory structure for accomplishing the automatic format conversion. The directory identifies the possible formats that are supported by the removable digital medium.

26 Claims, 12 Drawing Sheets

METHOD AND APPARATUS FOR AUTOMATIC FORMAT CONVERSION ON REMOVABLE DIGITAL MEDIA

TECHNICAL FIELD

The present invention relates to removable digital media. More particularly, the present invention is directed to a method and apparatus for converting the format of data transferred between a removable digital medium and a host.

BACKGROUND OF THE INVENTION

A variety of add-on or removable cards and modules for use in digital systems such as personal computers, personal digital assistants (PDAs), digital cameras, cellular phones, and pagers, are becoming widely used. For example, many digital devices are arranged to work with removable digital storage cards or media. Removable storage media usually employ flash memory. Flash memory is non-volatile and is ideal for mobile or hand-held devices because of its small size, low power consumption, high speed and superior reliability.

The Personal Computer Memory Card Interface Association (PCMCIA) has established an interface standard for removable digital storage media. It is known as the PCMCIA interface or PC card standard. It has become the standard for other removable media such as modems and hard drives. There are two main flash memory architectures that meet the PCMCIA interface standard. These are the Advanced Technology Attachment (ATA) flash and Linear flash. The ATA flash includes a processor in addition to memory, and emulates a hard disk drive. Linear flash relies on the processing ability of the host device.

The PCMCIA standard is often not suitable for small portable devices. Therefore, a number of removable digital media have been developed having smaller form factors than the standard PC card. Some examples of these smaller media include CompactFlash, Miniature Card, Solid State Floppy Disk Card (SSFDC) or SmartMedia, and MultiMedia Card. Most of these new, smaller cards, are provided with an adapter to conform to the PCMCIA standard to fit into devices having card slots arranged to accept PCMCIA standard cards.

Some of the advantages contributing to the recent success of removable digital media include system flexibility, portability and ease of data transfer from one host to another. However, the ability to transfer data from one host to another is limited by compatibility constraints. More particularly, data may be stored on a removable digital medium in any one of a number of data formats. Therefore, a host attempting to access information stored on a removable storage medium must support a data format that is compatible with the format of the stored data. Otherwise, the host will be unable to access the stored data. As digital technology evolves, it is likely that there will be a large number of devices that may not be compatible with new data formats. This is particularly true for portable devices or simple devices that are not usually upgraded to be compatible with new technology. Therefore, those devices that are not upgraded to be compatible with evolving digital technology will not be able to take advantage of the benefits associated with the evolving technology. Moreover, the advantage of using removable digital media to transfer data from one host to another will likely be increasingly impeded by compatibility constraints.

Therefore, there is a need for a method and apparatus for converting data, transferred between a host and a removable digital medium, from a particular format to a format that is compatible with the host, or to a format selected by the host. More particularly, a removable digital medium that supports a plurality of data formats and provides for the conversion of data from a particular format to a format that is compatible with a host device in which it is connected is needed. In addition, a removable digital medium that supports a plurality of data formats and provides for the conversion of data from a particular format to a format that is selected by a host device in which it is connected is needed.

SUMMARY OF THE INVENTION

The deficiencies and limitations of the prior art are overcome by the present invention which provides a removable digital medium supporting automatic format conversion. More particularly, the removable digital medium according to the present invention supports a plurality of data formats and converts data transferred between a host and the removable digital medium to another format that is supported by the removable storage medium and selected by the host. The removable digital medium according to the present invention is provided with a directory structure for accomplishing the automatic format conversion. The directory identifies the possible formats that are supported by the removable digital medium. In this manner, the invention enables existing or legacy consumer electronic devices to adapt to improvements in technology, such as improvements in image compression and file formats. In addition, the invention enables the advantage of removable digital media to transfer data from one host to another to be more fully realized.

According to another aspect of the present invention, a method of converting the data format of data transferred between a host and a removable digital medium to a format that is compatible with the host is provided.

In yet another aspect of the present invention, a method of converting the data format of data transferred between a host and a removable digital medium to a data format selected by the host, from a plurality of data formats supported by the removable digital medium.

According to another aspect of the invention, an improved removable digital medium for converting the data format of data transferred between a host and the removable digital medium to a format that is compatible with the host is provided.

According to yet another aspect of the present invention, an improved removable digital medium that supports a plurality of data formats and that converts the data format of data transferred between a host and the removable digital medium to a data format selected by the host is provided.

These and other objects and features of the present invention will be apparent upon consideration of the following detailed description of preferred embodiments thereof, presented in connection with the following drawings in which like reference numerals identify like elements throughout.

DETAILED DESCRIPTION OF THE INVENTION

In order to facilitate an understanding of the invention, a particular application of the invention is described. However, the description of the particular application of the invention is for illustration purposes only, and is not intended to limit the scope of the invention to the particular application. Those of ordinary skill in the art will appreciate that the invention may be implemented in many different applications.

The invention will be described in the general context of computer-executable instructions, such as program modules. Generally, program modules include routines, programs, objects, components, data structures, etc. that perform particular tasks or implement particular abstract data types. Moreover, those skilled in the art will appreciate that the invention may be practiced with a variety of computer system configurations, including hand-held devices, multiprocessor systems, microprocessor-based or programmable consumer electronics, network PC's, minicomputers, mainframe computers, and the like.

As noted above, removable digital media have recently enjoyed much success. At present, removable digital media, such as removable storage media, store data in the format in which it is received. Similarly, removable digital media output data in the format in which it is stored. The data formats may include JPEG (Joint Photographic Experts Group), GIF (Graphics Interchange Format), TIFF (Tagged Image File Format), BMP (Bit Mapped Graphics Format), MP3, WAV audio, Real audio, etc. According to the present invention, the data may be converted to a different format as it is saved onto removable digital media. Similarly, when the data is retrieved from removable digital media, it may be converted to the format required or requested by the host receiving the data. In addition, data may be stored in a data format that is different from input or output data format. For example, a file may be stored in a GIF data format, read as a BMP, but stored internally on the removable digital medium as a JPEG or proprietary compression format. In this manner, the advantage of using removable storage media to transfer data from one host to another can be more fully realized. In addition, the data conversion provided by the present invention will enable legacy devices or simple devices to take advantage of the advantages offered by new technology by converting data written from a legacy device or simple device to a new and better format that may be supported by the removable digital media.

Figure 1:
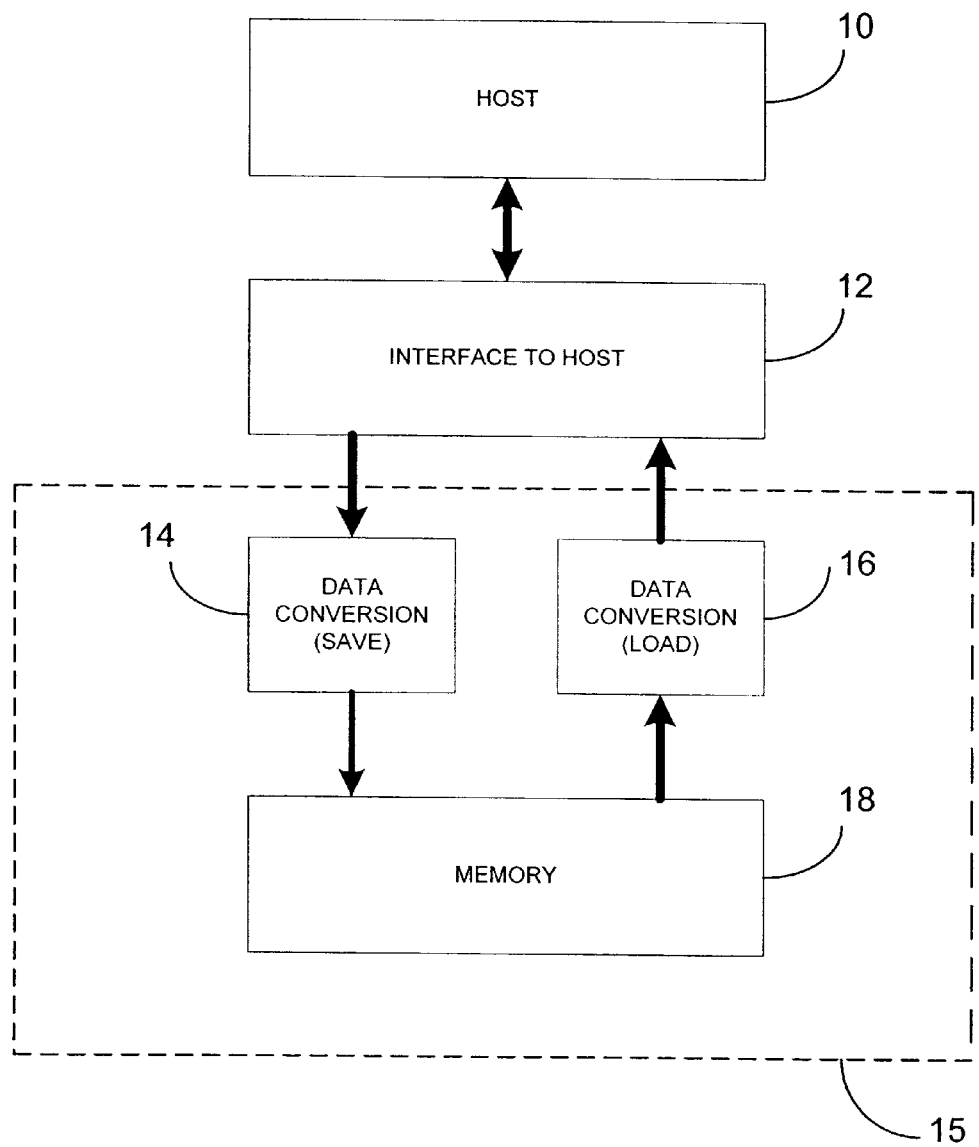
FIG. 1 shows the general flow of data according to the present invention.

Referring to FIG. 1, data is transferred between a host 10 and a memory 18 of a removable digital medium 15 via interface 12. The interface may be a PCMCIA interface or any other suitable interface including, but not limited to, SSFDC, IBM Microdrive™, Smartmedia, etc. The removable digital medium may be any removable digital media having a processor and memory. During data transfer, the data may be converted in either of the conversion blocks 14 or 16. In other words, data transferred between the host 10 and the memory 18 may be converted in a conversion block 14, 16 to or from a format that is compatible with or selected by the host 10. The conversion occurs in the removable digital medium 15. The format of the data stored in memory 18 may be any format prior to conversion.

Figure 2:
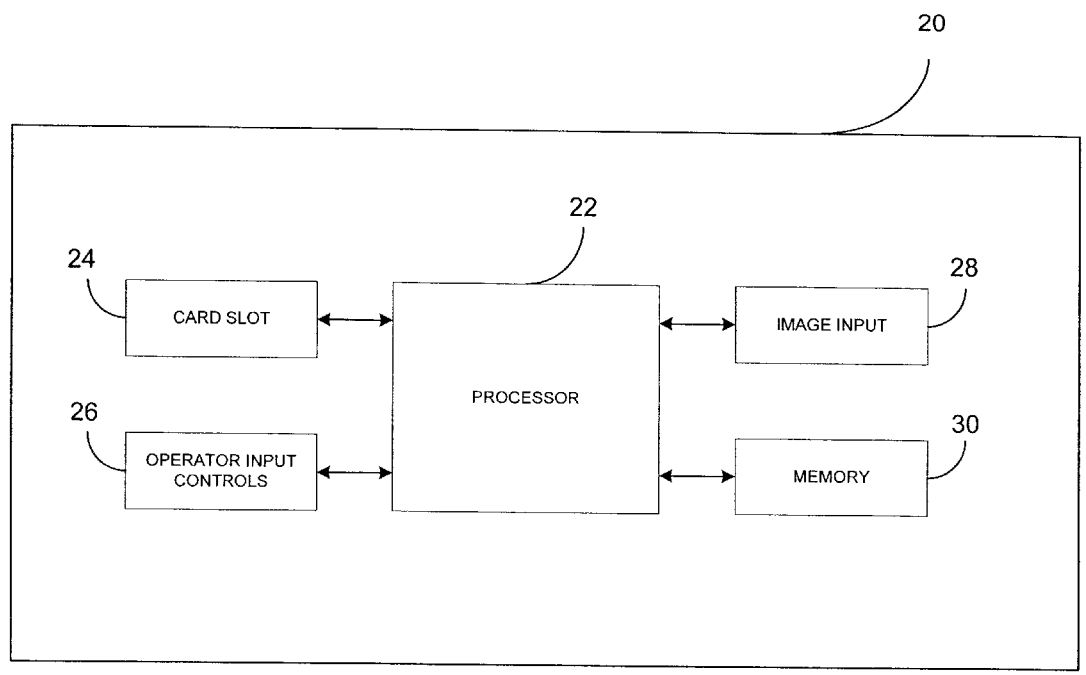
FIG. 2 shows basic components of a digital camera as a host device according to the present invention.

A particular application of the present invention is in the area of digital photography. Referring to FIG. 2, the basic elements of a digital camera 20 are shown. The digital camera 20 may be used as the host 10 in FIG. 1. Of course, those of ordinary skill in the art will appreciate that there are numerous other devices that may be used as the host 10 in FIG. 1, including PDAs, cellular phones, pagers, etc. The digital camera 20 includes a processor 22 that communicates with an image input 28 for receiving images, a memory 30, operator input controls 26 and a removable digital medium inserted into card slot 24. Image data may be stored in any of a number of different formats supported by the camera 20. Examples of these formats include GIF, JPEG, BMP, TIFF, FlashPix, etc. Each of these data formats are well known in the art and do not require description herein.

Figure 3A:
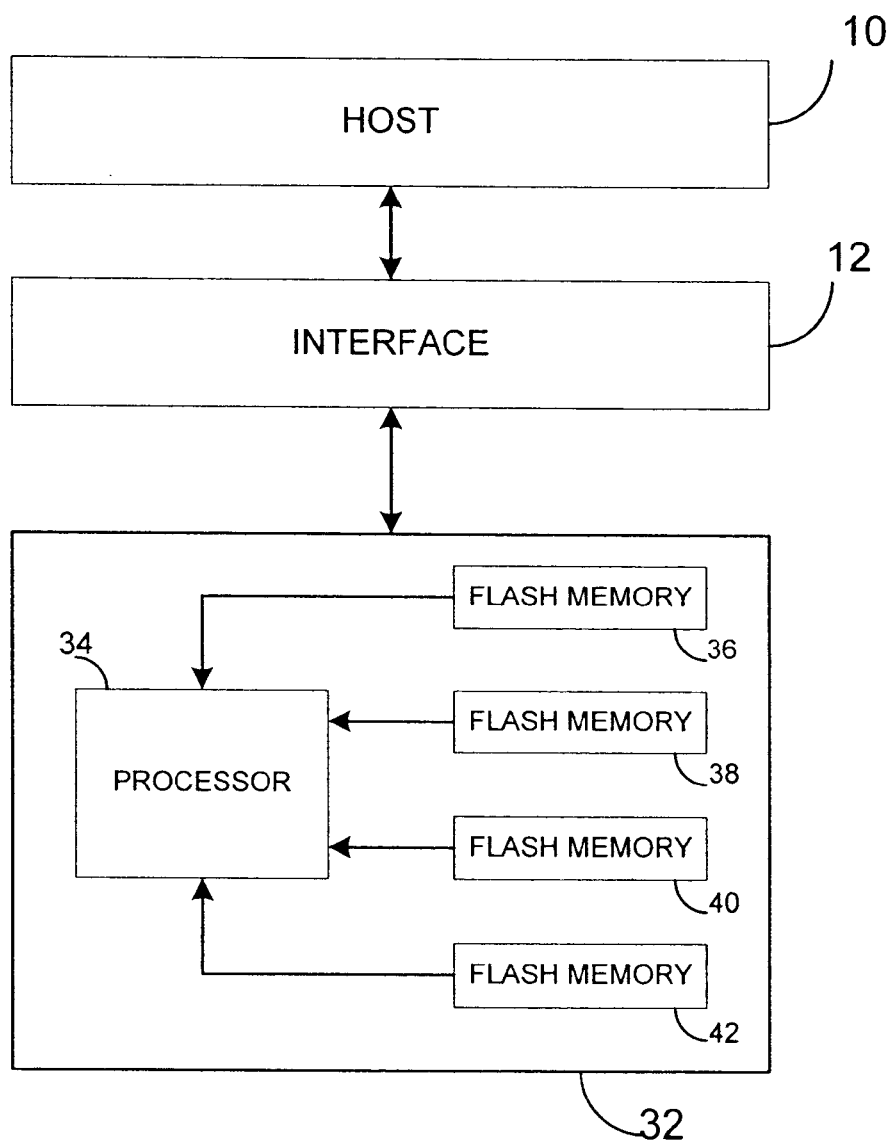
FIGS. 3A and 3B show an example of a removable digital medium in accordance with the present invention and conversion modules in the removable digital medium for performing format conversion according to an aspect of the present invention.

FIG. 3A shows the basic elements of the removable storage medium 32. These elements include a processor 34 and banks of flash memory 36–42. The flash memory may also be a single memory array as is known in the art. The removable storage medium 32 may be any removable storage medium having a processor and memory. It is understood that any removable digital media including a processor and memory may be used. The removable storage medium 32 according to the present invention may support a plurality of data formats. With respect to the digital photography example, the removable storage medium 32 may store formats such as the GIF, JPEG, BMP, TIFF, FlashPix formats noted above. In addition, the removable storage medium 32 may support various other data format information such as data compression rates, data encryption keys, etc.

Figure 3B:
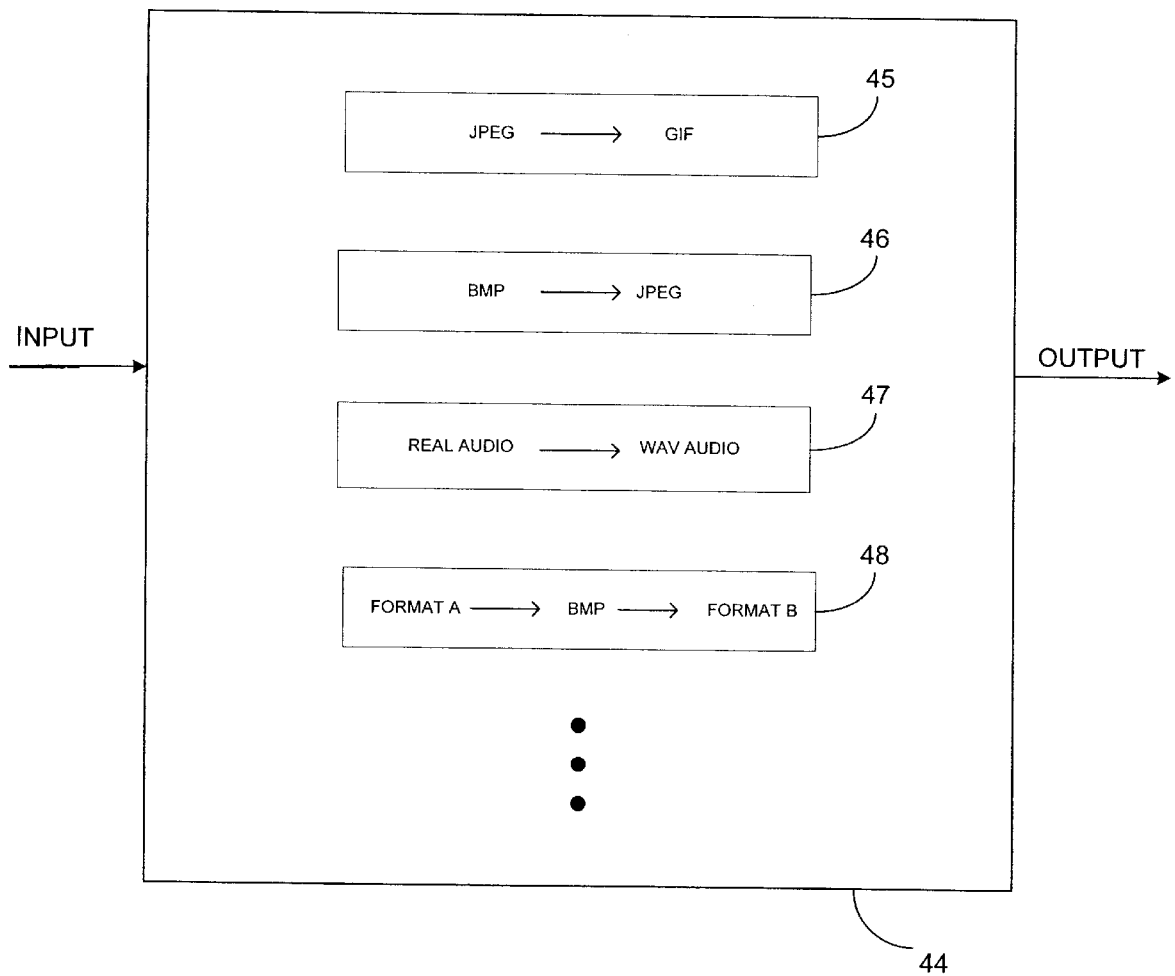

The format conversion may be performed as a processor operation or by utilizing a conversion hardware module on the removable storage medium 32 as shown in FIG. 3B. The conversion block 4 includes examples of possible conversion modules such as a JPEG→GIF conversion module 45, a BMP→JPEG conversion module 46, or a Real audio→WAV audio module 47. FIG. 3B illustrates the situation where there is direct conversion from one format to the desired format. However, the conversion may be indirect to reduce the amount of flash memory dedicated to the conversion process. For example, the format conversion may be from a particular format to the BMP format and then to the desired format. Therefore, the system need only support the conversion from BMP format to the other formats supported by the removable storage device. This is shown as another block 48 in FIG. 3B.

Figure 4:
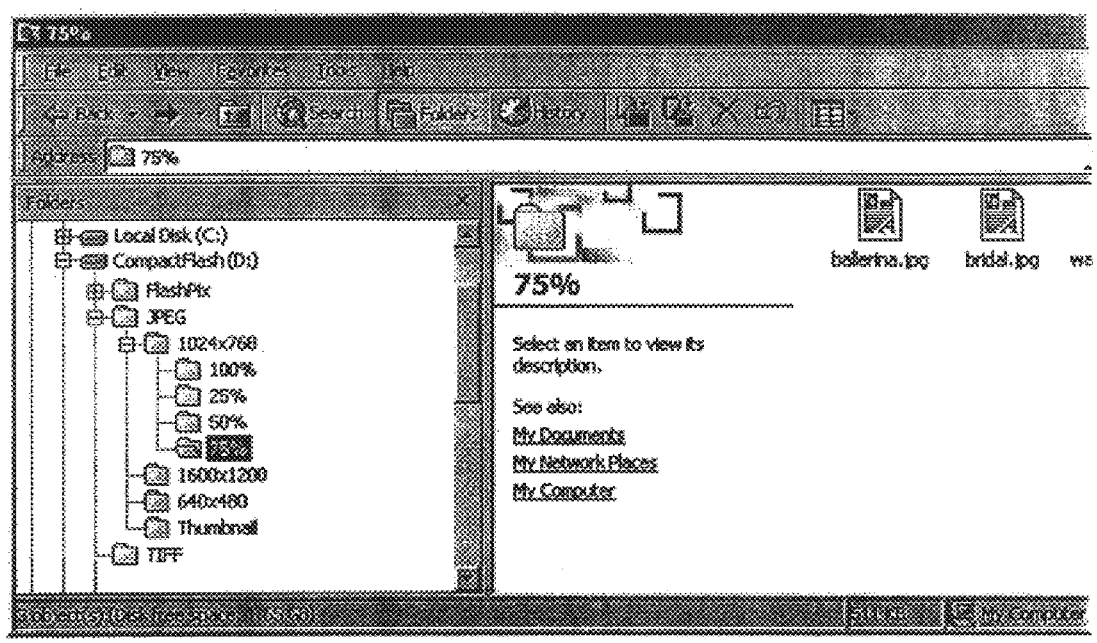
FIG. 4 shows an example of a directory structure indicating data formats supported by the removable digital medium according to the present invention.

The data formats and other data format information supported by the removable storage medium 32 are indicated in a directory structure. With respect to the current example, FIG. 4 illustrates the directory structure for the removable storage medium 32. As shown in FIG. 4, the removable storage medium 32, which is shown to be a CompactFlash for example, supports data formats including FlashPix, JPEG, and TIFF. In addition, each of the data formats further support a variety of resolutions including Thumbnail, CIF (Cells In Frames), SVGA (Super VGA), etc., in a variety of sizes including 20K, 100K, and 241K, or the like, or compression ratios including 75%, 50%, 25%. As shown in FIG. 4, a directory structure can be generated to reflect the various sizes, resolutions, and formats available.

According to the present invention, every image file stored on the removable storage medium 32 may be available in each of the formats set forth in the directory and within every subdirectory or at least one of the subdirectories. This is possible due to the conversion process performed by the processor 34 of the removable storage medium 32. In addition, the conversion ability provided by the removable storage medium 32 makes it possible to offer an image file in any of a number of data formats even though only one copy of the image file is stored on the removable storage medium. If a host, such as the camera 20, requests an image file in a format other than the format in which it is stored, the variant format of the image file is enabled by the conversion process performed by the processor 34. Therefore, variants of the image file can be generated on the fly (e.g., in real time where the conversion is performed as quickly as the data is received). In other words, the directory may be a "virtual directory" indicating the formats in which an image file is available even though the data file may not be stored in every format supported by the removable storage medium. The process of converting data from one format to another is well known to those of ordinary skill in the art. Therefore, a detailed description of the conversion process is not necessary.

Referring again to FIG. 4, the image files ballerina.jpg and bridal.jpg, for example, may appear in every directory/subdirectory although only one copy of each file is stored on the removable storage medium 32. This "virtual directory" is provided to the host camera 20. If the host camera 20 requests that an image file be loaded in a format that is a variant of the format in which the image file is stored, the variant format can be generated on the fly by the processor 34 of the removable storage medium 32, and then supplied to the host camera 20. It is possible to store multiple copies of each file in each of the directories/subdirectories. However, memory space may be greatly reduced by utilizing the virtual directory and conversion process noted above.

Figure 5:
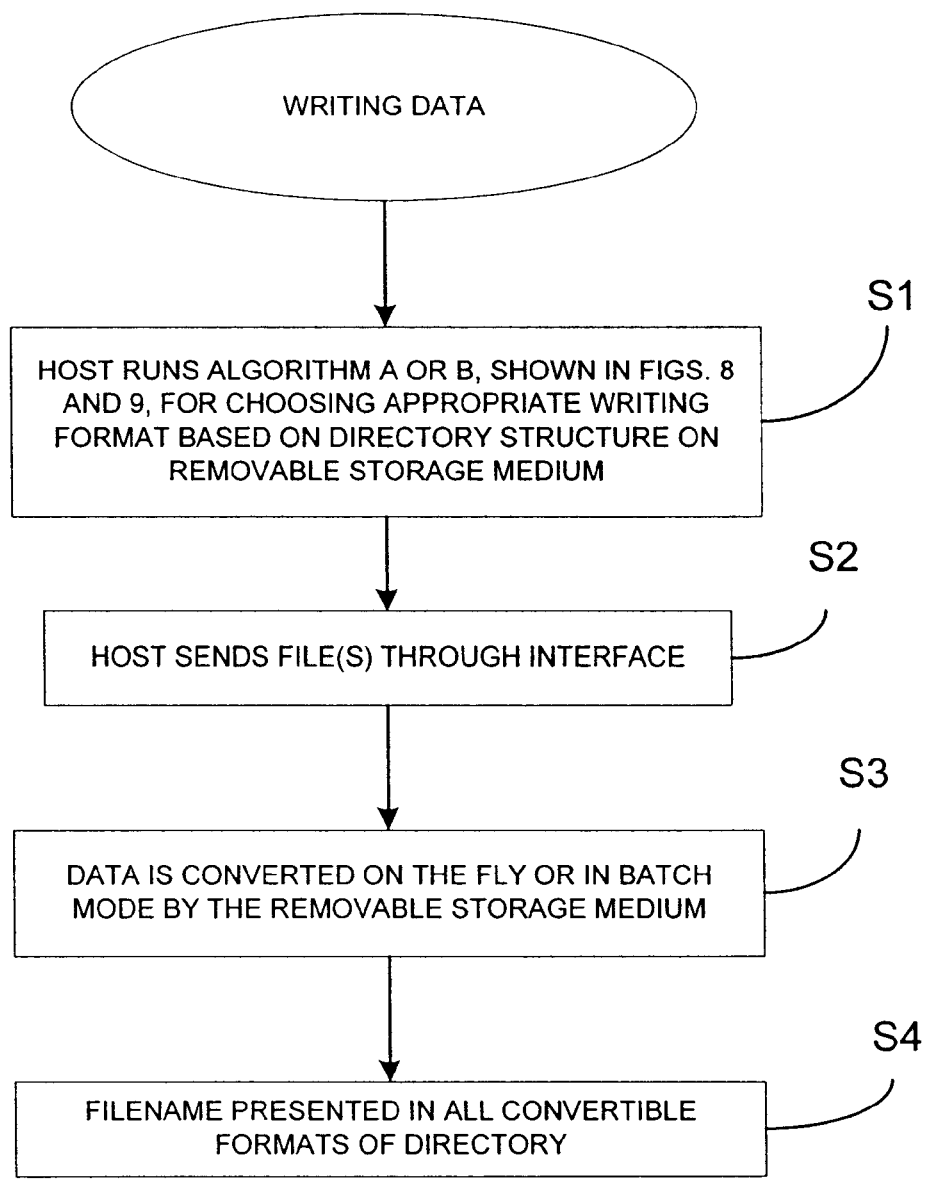
FIG. 5 shows a flow diagram of the method steps for writing data to the removable digital medium according to the present invention.
Figure 8:
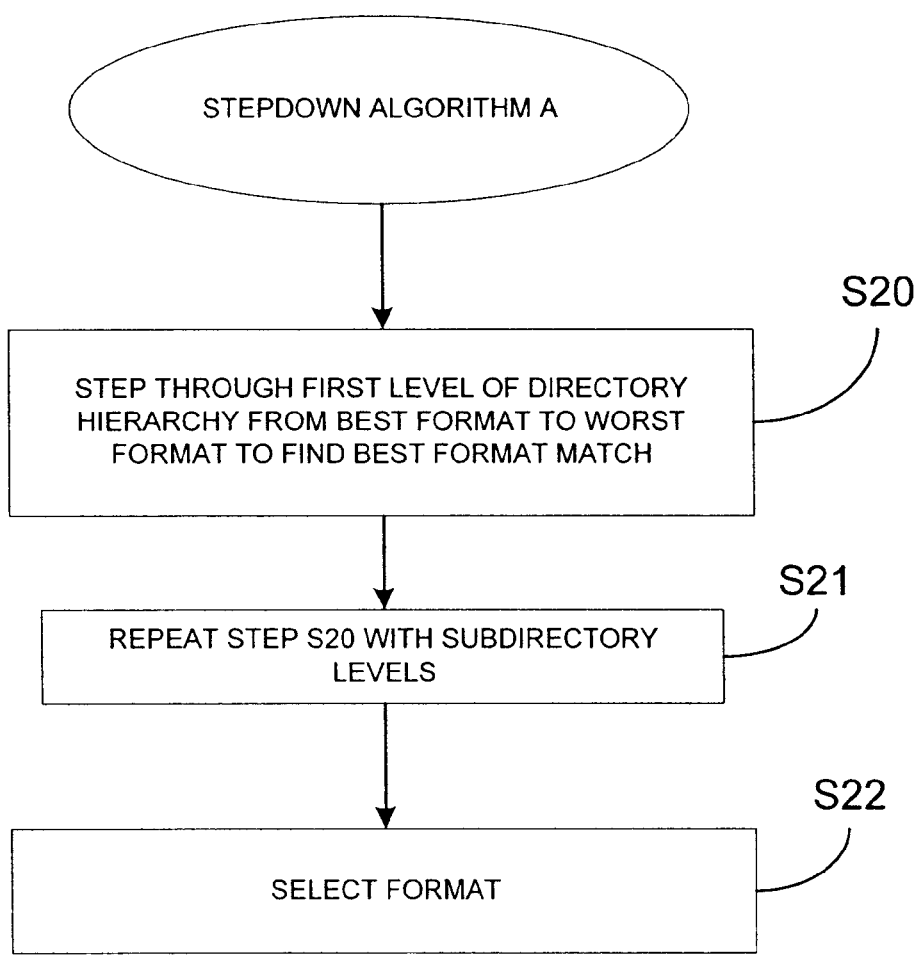
FIG. 8 shows a flow diagram of the steps for performing a step-down selection routine for a writing operation according to the present invention.
Figure 9:
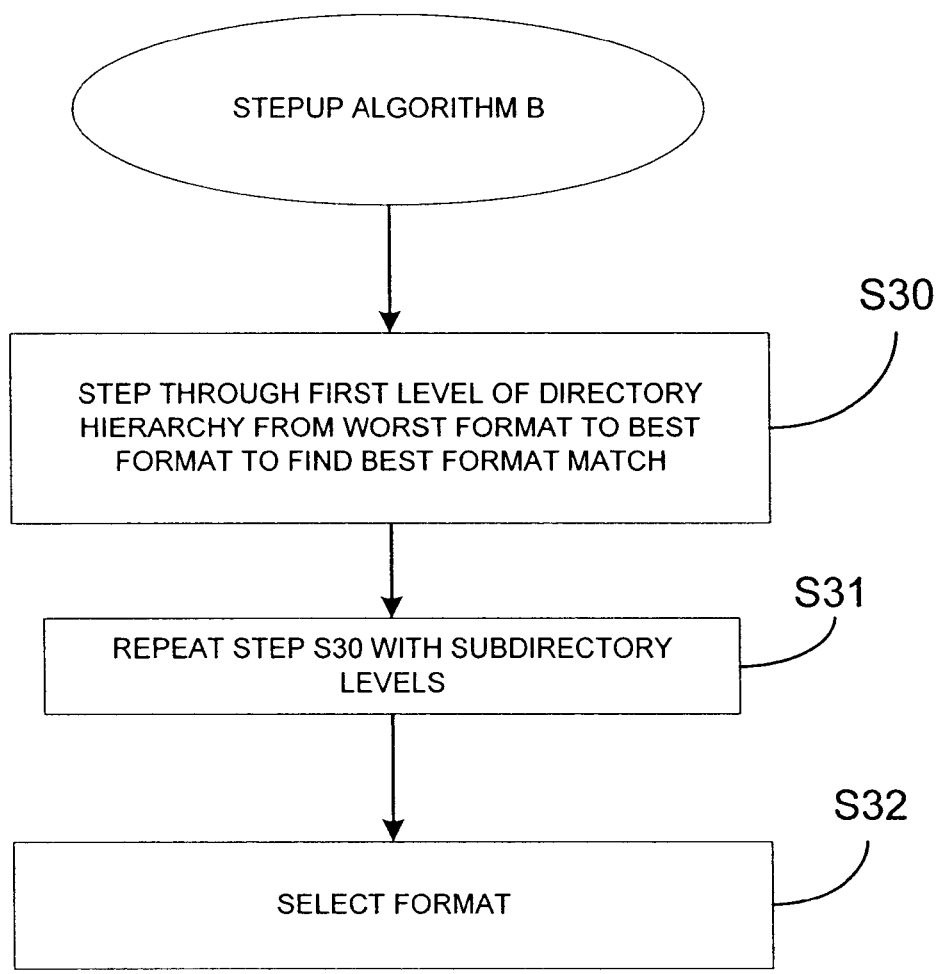
FIG. 9 shows a flow diagram of the steps for performing a step-up selection routine for a writing operation according to the present invention.

The steps for writing data to the removable storage medium 32 are illustrated in FIG. 5. In step S1, the host, which is camera 20 in our example, runs either a step-down algorithm as shown in FIG. 8 or a step-up algorithm as shown in FIG. 9 to determine the best format for writing data to the removable storage medium 32. The steps performed in FIGS. 8 and 9 will be described in detail below. Once the host has selected a format, the host sends the data file(s) through the interface 12 to removable storage medium 32 in step S2. In step S3, the processor 34 of the removable storage medium 32 converts the data supplied from the host to the chosen format on the fly as it is being stored in memory. Alternatively, the processor 34 may convert the data in batch mode where the data is queued and then operated on. For example, if the host chose to write the data in JPEG format, then in batch mode, the data is written as it is received and stays in memory until the processor 34 has free time to convert it to JPEG format. Finally, in step S4, the filename of the data written on the removable storage medium 32 is presented in all of the convertible formats listed in the directory.

Step S4 may be accomplished in a variety of ways such as making the filename available directly by adding it to all of the convertible formats of the directory, or by generating the applicable filename information only when it is requested. In other words, the filename need not be available for each format in the directory until there is a request for it. For example, the filename ballerina.jpg, shown in FIG. 4, can either be propagated to the file system directly by making a copy of this file or on demand so that whenever a host requests a directory, that directory can be made up on the fly (e.g., in real time where the directory is generated as quickly as the data is received) to include all of the filenames under all of the directory formats.

Figure 6A:
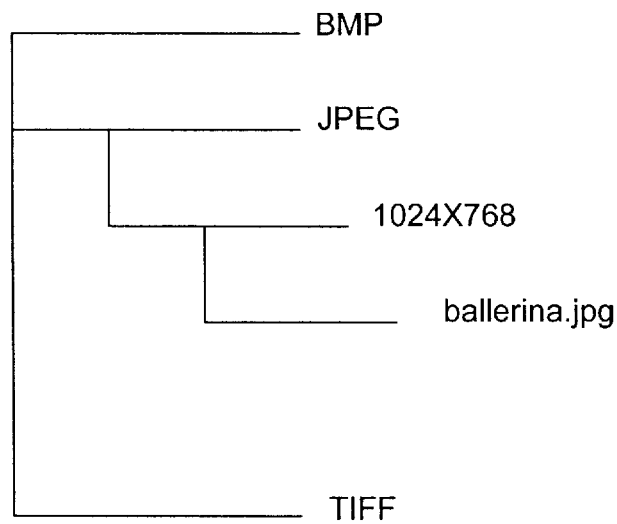
FIGS. 6A and 6B show examples of a directory and data repository according to the present invention.
Figure 6B:
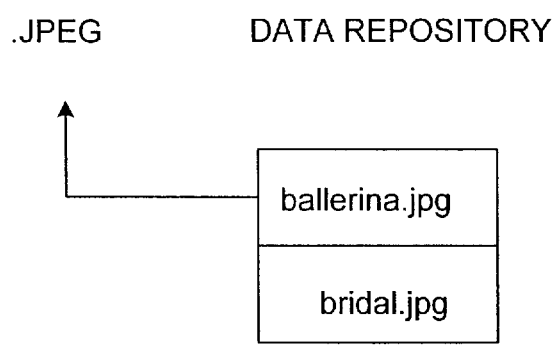

For example, the directory may be presented to the host as a large directory showing all of the files included in each format and subdirectory. Alternatively, the directory may be presented to the host based upon the demands of the host. For example, if the host requests the file ballerina.jpg in resolution of 1024×768, the directory supplied to the host would appear as shown in FIG. 6A. The actual files such as ballerina.jpg and bridal.jpg may be stored in a data repository as shown in FIG. 6B.

Figure 7:
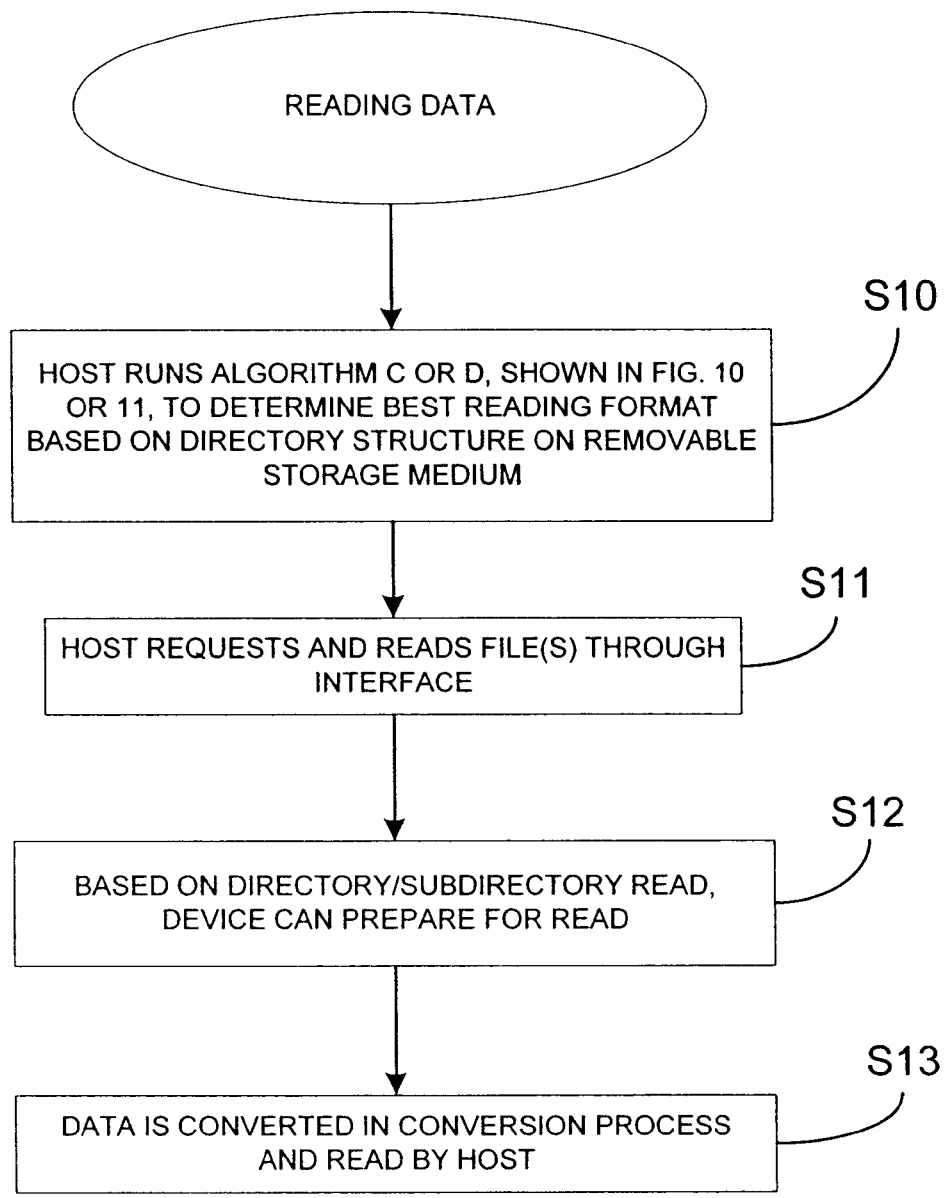
FIG. 7 shows a flow diagram of the method steps for reading data from the removable digital medium according to the present invention.
Figure 10:
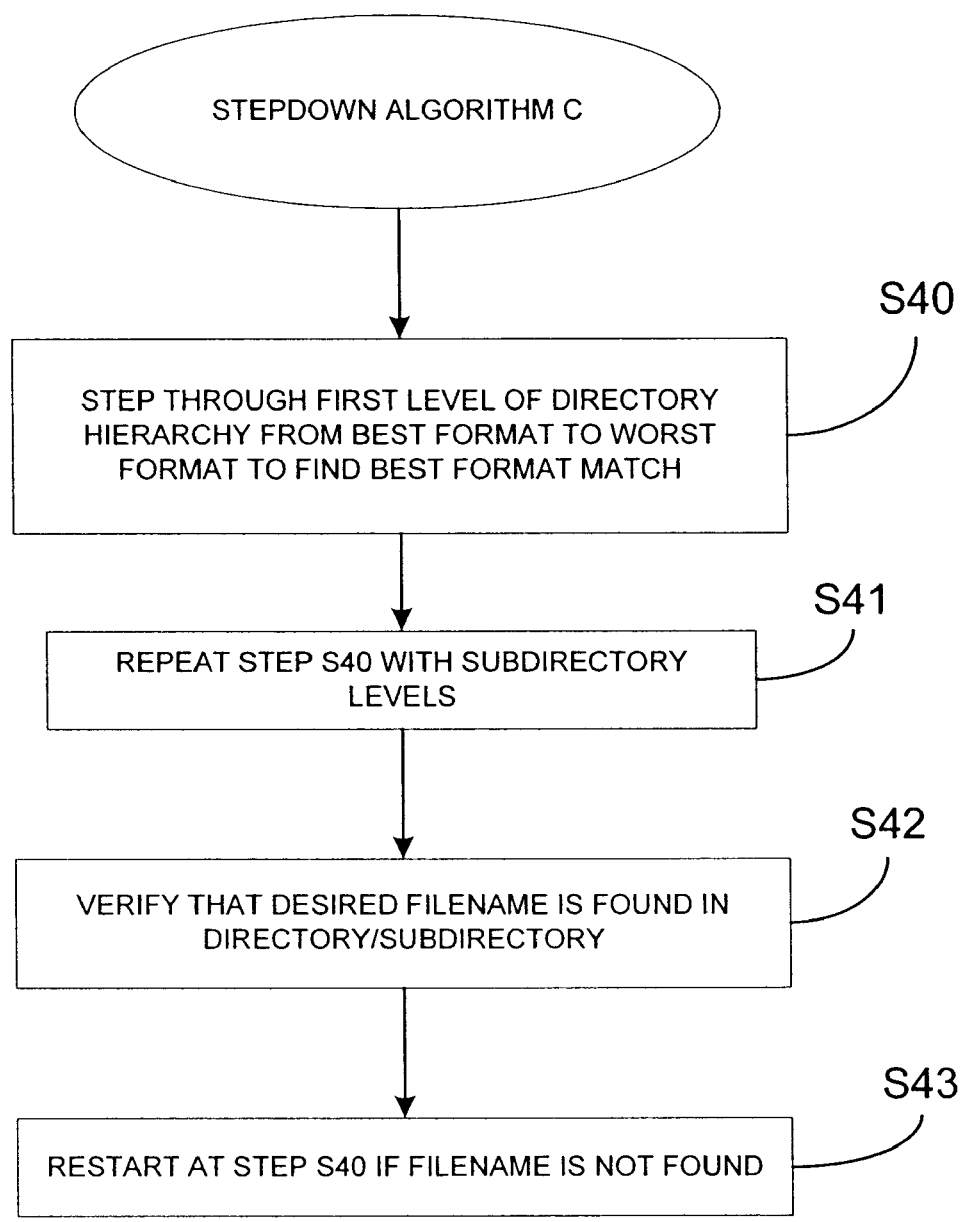
FIG. 10 shows a flow diagram of the steps for performing a step-down selection routine for a reading operation according to the present invention.
Figure 11:
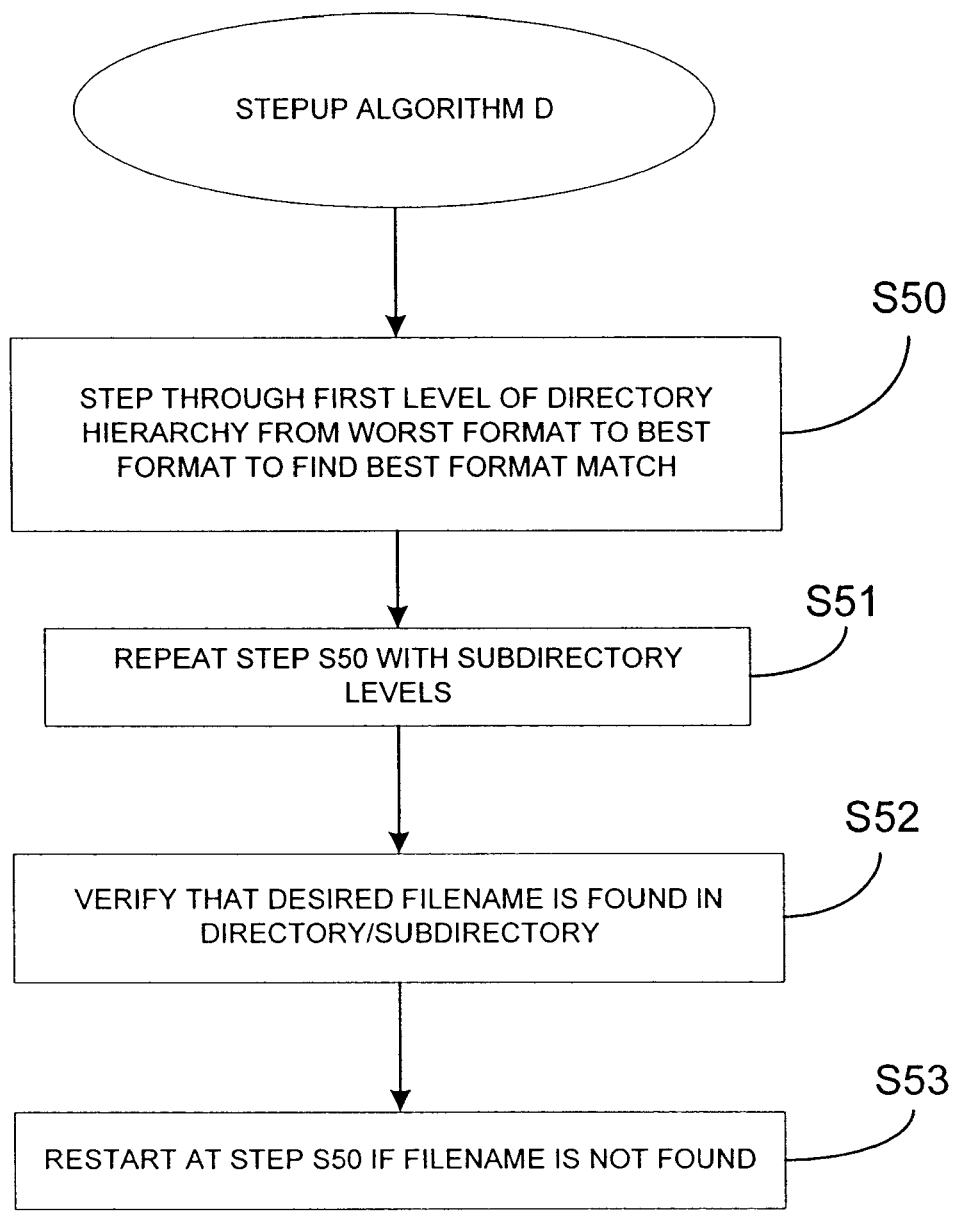
FIG. 11 shows a flow diagram of the steps for performing a step-up selection routine for a reading operation according to the present invention.

The steps for reading data from the removable storage medium 32 are illustrated in FIG. 7. In step S10, the host, which is camera 20 in our example, runs either a step-down algorithm as shown in FIG. 10 or a step-up algorithm as shown in FIG. 11 on the directory on the removable storage medium, to determine the best reading format for reading a particular file from the removable storage medium 32. FIGS. 10 and 11 are discussed in detail below. As noted above, the directory including the filenames of available files may be generated in advance or on demand, as discussed with respect to FIGS. 6A and 6B. In step S11, the host transmits a read request for a particular file through the interface 12. Based upon the directory/subdirectory information of the selected format, the removable recording medium 32 prepares for the read in step S12. Finally, in step S13, the data in the particular file is converted to the selected format and supplied to the host via interface 12. In step S14, the host reads the data.

The step-down algorithm A of FIG. 8 will now be described with respect to a writing operation. In step S20, the host steps through the formats listed in the first level of the directory, beginning with the best data format and continuing down to the worst data format, to determine the best format for writing a particular file. In the present example using FIG. 4 as the directory, the camera 20 looks for the best format, resolution and compression it can support and steps down the directory until it finds something that works. For example, during a write operation, the camera 20 may determine that the best format it can support is JPEG. In step S21, the host repeats step S20 with respect to each subdirectory. In the present example, the camera 20 steps through the subdirectories to determine the best resolution and compression rate. The camera 20 may choose to write the data at a resolution of 1024×768 and at 100% compression rate (no compression). In step S22, the host makes the format selection.

Similar processing is performed with respect to the step-up algorithm B shown in FIG. 9, except that in step S30 the host steps through the formats listed in the first level of the directory, beginning with the worst data format and continuing up to the best data format. Otherwise steps S31–S32 correspond to steps S21–S22 in FIG. 8.

The step-down algorithm C of FIG. 10 will now be described with respect to a reading operation. In step S40, the host steps through the formats listed in the first level of the directory, beginning with the best data format and continuing down to the worst data format, to determine the best format for reading a particular file. In the present example using FIG. 4 as the directory, the camera 20 looks for the best format, resolution and compression it can support and steps down the directory until it finds something that works. For example, during a read operation, the camera 20 may determine that the best format it can support is JPEG. In step S41, the host repeats step S40 with respect to each subdirectory. In the present example, the camera 20 steps through the subdirectories to determine the best resolution and compression rate. The camera 20 may choose to read the data at a resolution of 1024×768 and at 100% compression rate (no compression). In step S42, the host verifies that that the particular file to be read is available in the directory/subdirectory. For example, the camera 20 may verify that the particular file ballerina.jpg is found under the directory JPEG and subdirectories for 1024×768 and 100% compression. In step 423, processing returns to step S40 if the particular filename is not found in the directory/subdirectory.

Similar processing is performed with respect to the step-up algorithm D shown in FIG. 11, except that in step S50 the host steps through the formats listed in the first level of the directory, beginning with the worst data format and continuing up to the best data format. Otherwise steps S51–S53 correspond to steps S41–S43 in FIG. 10.

It will be appreciated that in the present invention, data conversion is performed as necessary. More particularly, if the host writes data in a format that is supported by the removable digital medium, then no data conversion is necessary.

The data conversion on removable digital media provided by the present invention enhances the advantage of removable storage media transferring data from one host to another as it increases compatibility with a variety of hosts. In addition, the data conversion on the removable digital media enables legacy devices or simple devices to take advantage of new technology by enabling data to be stored on the removable digital media in a format not supported by the legacy devices or simple devices.

Although the invention has been described with respect to digital imaging, one of ordinary skill in the art will appreciate that the invention may be implemented with respect to a number of host devices. For example, the same format issues arise with audio data. More particularly, there is Real audio, WAV files, MP3 files, CD files, etc. Therefore, the removable digital media may be implemented to support a plurality of audio data formats.

While particular embodiments of the invention have been shown and described, it is recognized that various modifications thereof will occur to those skilled in the art without departing from the spirit and scope of the invention. For example, the invention may be implemented using data schema or web pages rather than the directory structure described herein. The described embodiments are to be considered in all respects only as illustrative and not restrictive. Therefore, the scope of the herein-described invention shall be limited solely by the claims appended hereto.

What is claimed is:

1. A method of converting the data format of data transferred between a host and a removable digital medium, wherein the removable digital medium supports a plurality of data formats, comprising the steps of:

providing format information, representing the data formats supported by the removable digital medium, from the removable digital medium to the host;

receiving, at the removable digital medium, a selection signal output by the host, wherein the selection signal represents one of the data formats selected by the host;

converting, at the removable digital medium, data to be transferred between the host and the removable digital medium into the data format selected by the host; and transferring the converted data between the host and the removable digital medium in the data format selected by the host.

2. The method according to claim 1, wherein the step of providing format information comprises:

providing a directory of the plurality of data formats supported by the removable digital medium.

3. The method according to claim 2, wherein the transferring step comprises:

storing the converted data on the removable digital medium in the data format selected by the host.

4. The method according to claim 3, wherein each of the data formats of the directory include at least one subdirectory, and wherein the transferring step further comprises:

updating the subdirectory of each of the data formats of the directory to include the filename of the data stored on the removable digital medium.

5. The method according to claim 4, wherein the storing step comprises:

storing a single copy of the data received from the host, and wherein the updating step comprises adding the filename of the single copy of the data received from the host to the subdirectory of each of the plurality of data formats in the directory to indicate that the single copy of the data is available in any one of the plurality of data formats.

6. The method according to claim 4, wherein the storing step comprises:

storing a single copy of the data received from the host, and wherein the updating step comprises adding the filename of the single copy of the data received from the host to the subdirectory of the data format selected by the host when the data is requested by the host.

7. The method according to claim 3, wherein the converting step comprises:

converting the data in real time as it is received from the host.

8. The method according to claim 3, wherein the converting step comprises:

converting the data in batch mode.

9. The method according to claim 2, wherein the transferring step comprises:

receiving, at the removable digital medium, a data request from the host for a specific data file stored on the removable digital medium; and transferring the converted data to the host.

10. A computer-readable medium having computer-executable instructions for performing the steps of:

providing format information, representing data formats supported by a removable digital medium, from the removable digital medium to a host;

receiving, at the removable digital medium, a selection signal output by the host, wherein the selection signal represents one of the data formats selected by the host;

converting, at the removable digital medium, data to be transferred between the host and the removable digital medium into the data format selected by the host; and transferring the converted data between the host and the removable digital medium in the data format selected by the host.

11. The computer-readable medium according to claim 10, having further computer-executable instructions for performing the step of providing format information comprising:

providing a directory of the plurality of data formats supported by the removable digital medium.

12. The computer-readable medium according to claim 11, having further computer-executable instructions for performing the transferring step comprising:

storing the converted data on the removable digital medium in the data format selected by the host.

13. The computer-readable medium according to claim 12, wherein each data format of the directory includes at least one subdirectory, and wherein the computer-readable medium has further computer-executable instructions for performing the transferring step further comprising:

updating the subdirectory of each of the data formats of the directory to include the filename of the data stored on the removable digital medium.

14. The computer-readable medium according to claim 13, having further computer-executable instructions for performing the storing step comprising storing a single copy of the data received from the host, and wherein the updating step comprises adding the filename of the single copy of the data received from the host to the subdirectory of each of the plurality of data formats to indicate that the single copy of the data is available in any one of the plurality of data formats.

15. The computer-readable medium according to claim 12, wherein each data format of the directory includes at least one subdirectory, and wherein the computer-readable medium has further computer-executable instructions for performing the transferring step further comprising:

storing a single copy of the data received from the host, and wherein the updating step comprises adding the filename of the single copy of the data received from the host to the subdirectory of the data format selected by the host when the data is requested by the host.

16. The computer-readable medium according to claim 12, having further computer-executable instructions for performing the converting step comprising:

converting the data on the fly as it is received from the host.

17. The computer-readable medium according to claim 12, having further computer-executable instructions for performing the converting step comprising:

converting the data in batch mode.

18. The computer-readable medium according to claim 11, having further computer-executable instructions for performing the transferring step comprising:

receiving, at the removable digital medium, a data request from the host for a specific data file stored on the removable digital medium; and transferring the converted data to the host.

19. A method for converting the data format of data transferred between a host and a removable digital medium, wherein the removable digital medium supports a plurality of data formats, comprising the steps of:

providing format information, representing the data formats supported by the removable digital medium, from the removable digital medium to the host;

selecting, at the host, a data format from the data formats supported by the removable digital medium;

outputting data from the host to the removable digital medium;

converting, at the removable digital medium, the data output from the host into the data format selected by the host to generate converted data;

storing, at the removable digital medium, the converted data under a filename; and adding the filename to a subdirectory for each of the data formats listed in the directory to indicate that the data under the filename is available in each of the data formats supported by the removable digital medium.

20. The method according to claim 19, wherein the selecting step performed by the host comprises:

identifying the data formats listed in the directory provided by the removable digital medium;

stepping through each of the data formats in the directory from the most desirable format to the least desirable format; and identifying a preferable format to be selected.

21. The method according to claim 19, wherein the selecting step performed by the host comprises:

identifying the data formats listed in the directory provided by the removable digital medium;

stepping through each of the data formats in the directory from the least desirable format to the most desirable format; and identifying a preferable format to be selected.

22. A method for converting the data format of data transferred between a host and a removable digital medium, wherein the removable digital medium supports a plurality of data formats, comprising the steps of:

providing format information, representing the data formats supported by the removable digital medium, from the removable digital medium to the host;

selecting, at the host, a data format from the data formats supported by the removable digital medium;

outputting a read request from the host to the removable digital medium with respect to a data file stored on the removable digital medium;

retrieving the data file at the removable digital medium upon receipt of the read request;

converting, at the removable digital medium, data stored in the data file into the data format selected by the host to generate converted data; and outputting the converted data from the removable digital medium to the host.

23. The method according to claim 22, wherein the step of providing format information comprises:

providing a directory of the plurality of data formats supported by the removable digital medium, and at least one subdirectory for each of the data formats in the directory, wherein the subdirectory for each of the data formats in the directory lists filenames of respective data files available in the corresponding data format.

24. The method according to claim 23, wherein the selecting step performed by the host comprises:

identifying the data formats listed in the directory provided by the removable digital medium;

stepping through each of the data formats in the directory from the most desirable format to the least desirable format; and identifying a preferable format to be selected.

25. The method according to claim 23, wherein the selecting step performed by the host comprises:

identifying the data formats listed in the directory provided by the removable digital medium;

stepping through each of the data formats in the directory from the least desirable format to the most desirable format; and identifying a preferable format to be selected.

26. A removable digital medium for use with a host device, comprising:

a memory;

a program memory for storing conversion program files corresponding to data formats supported by the removable digital medium, respectively; and a controller, coupled to the memory and to the program memory, wherein the controller is arranged to convert data written to or read from the removable digital medium to one of the data formats supported by the removable digital medium in response to selection of a particular data format by the host device.

* * * * *